United States Patent
Allen et al.

(10) Patent No.: US 7,005,001 B2
(45) Date of Patent: Feb. 28, 2006

(54) X-SPRING VOLUME COMPENSATION FOR AUTOMOTIVE CARBON CANISTER

(75) Inventors: Christopher D. Allen, Eastpointe, MI (US); James T. Dumas, Clinton Township, MI (US); Donald L. Gepper, Commerce Township, MI (US)

(73) Assignee: Dayco Products, LLC, Miamisburg, OH (US)

( * ) Notice: Subject to any disclaimer, the term of this patent is extended or adjusted under 35 U.S.C. 154(b) by 0 days.

(21) Appl. No.: 10/788,752

(22) Filed: Feb. 26, 2004

(65) Prior Publication Data

US 2005/0188850 A1    Sep. 1, 2005

(51) Int. Cl.
*B01D 53/04* (2006.01)
*F02M 33/02* (2006.01)

(52) U.S. Cl. .................. 96/149; 96/137; 55/385.3; 55/475; 123/519; 267/103

(58) Field of Classification Search .................. 96/137, 96/139, 149, 152; 55/385.3, 475; 123/518–521; 267/103, 163, 107–109
See application file for complete search history.

(56) References Cited

U.S. PATENT DOCUMENTS

| | | | | |
|---|---|---|---|---|
| 691,655 | A * | 1/1902 | McEvilly | 62/318 |
| 2,614,830 | A * | 10/1952 | Mitchell | 267/163 |
| 3,348,692 | A * | 10/1967 | Balogh | 210/266 |
| 3,411,629 | A * | 11/1968 | Wilber et al. | 210/282 |
| 3,730,158 | A * | 5/1973 | St. Amand | 123/519 |
| 4,203,401 | A | 5/1980 | Kingsley et al. | |
| 4,308,840 | A * | 1/1982 | Hiramatsu et al. | 123/519 |
| 4,964,900 | A * | 10/1990 | Thompson et al. | 96/137 |
| 5,098,453 | A | 3/1992 | Turner et al. | |
| 5,122,172 | A * | 6/1992 | Sherwood et al. | 96/149 |
| 5,275,642 | A * | 1/1994 | Bassine | 96/149 |
| 5,427,609 | A * | 6/1995 | Zoglman et al. | 95/98 |
| 5,599,384 | A * | 2/1997 | Yoshida et al. | 96/143 |
| 5,620,507 | A * | 4/1997 | Oborne et al. | 96/149 |
| 6,484,339 | B1 * | 11/2002 | Mossbeck et al. | 5/716 |
| 6,551,388 | B1 | 4/2003 | Oemcke et al. | |
| 6,826,791 | B1 * | 12/2004 | Fromme | 5/247 |

\* cited by examiner

*Primary Examiner*—Robert H. Spitzer
(74) *Attorney, Agent, or Firm*—Joseph V. Tassone; Thompson Hine LLP

(57) ABSTRACT

A fuel vapor storage canister is provided. The canister includes a vapor storage chamber of variable volume, a partition, vapor adsorbing material, and a volume compensator. The partition is movable within the canister and partially defines the vapor storage chamber. The vapor adsorbing material is located in the vapor storage chamber. The volume compensator includes a spring having at least three legs that are deflected by and exert pressure against the movable partition to control the volume of the vapor storage chamber. In one embodiment, the legs of the spring may be evenly spaced to exert a balanced pressure. The spring may include two pairs of opposing legs, where the spring rate between the pairs of legs may vary. The spring may be comprised of two angularly offset band springs and may be formed from a unitary member.

7 Claims, 1 Drawing Sheet

X-SPRING VOLUME COMPENSATION FOR AUTOMOTIVE CARBON CANISTER

TECHNICAL FIELD

The present invention relates generally to fuel vapor storage canisters, and more specifically, to a fuel vapor storage canister having a new volume compensator.

BACKGROUND

Fuel vapor storage canisters have become standard pieces of equipment on vehicles for the recovery and storage of fuel emissions. Generally, fuel vapor canisters include an elongated canister containing a bed of fuel adsorbent material, such as activated carbon. Air containing fuel vapors enters the fuel storage canister from a tube connected to the vehicle's fuel tank. The fuel vapors are adsorbed into the bed of carbon and the filtered air is released into the atmosphere. Later, the fuel vapors are desorbed by the carbon and vented through a purge line to the engine.

During its life a fuel vapor storage canister may be exposed to a wide temperature range that may cause the canister to expand and contract, varying the volume of the interior of the canister. The canister may also be exposed to vibration and motion, which may shift the carbon in the canister. This vibration and thermal expansion and contraction may cause the carbon particles to erode against one another. Erosion of the carbon particles creates flow paths through which the vapor may escape without being properly adsorbed by the carbon. Accordingly, fuel vapor storage canisters typically include a volume compensator to securely pack the activated carbon contained within the canister.

Existing volume compensators compact the carbon bed through a plate biased against the bed of activated carbon by one or more coil springs, as shown in FIG. 1. The use of multiple springs is costly and complicates the assembly process. Additionally, individual variances in the springs cause uneven pressure against the grid.

Accordingly, a new volume compensator design is desired.

SUMMARY

In a first aspect, a fuel vapor storage canister for storing and recovering fuel emissions is provided. The fuel vapor storage canister includes a vapor storage chamber of variable volume, a movable partition that partially defines the vapor storage chamber, vapor adsorbing material in the vapor storage chamber and a volume compensator. The volume compensator includes a spring having at least three legs that are deflected by and exert pressure against the movable partition to control the volume of the vapor storage chamber. In one embodiment, the spring may have four evenly spaced legs providing balanced pressure against the movable partition. In another embodiment, the spring may consist of two or more angularly offset band springs.

DETAILED DESCRIPTION

Figure 1:
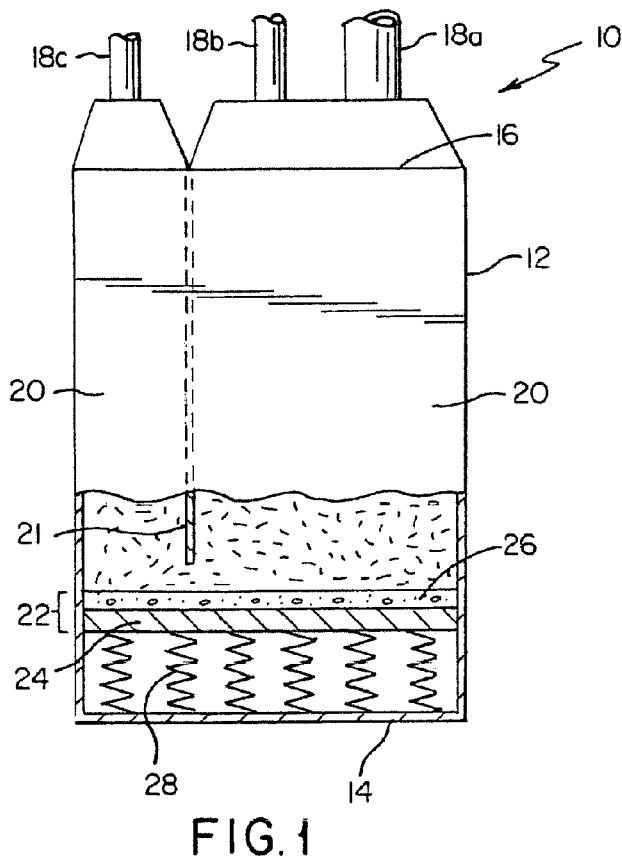
FIG. 1 is a cross-section of a fuel vapor canister with a multiple coil spring volume compensator according to the prior art.

FIG. 1 is a cross-section view of a fuel vapor storage canister 10 existing in the prior art. The storage canister 10 includes a housing 12 of generally rectangular cross-section. The canister includes a bottom wall 14, a top wall 16, and a plurality of tubes extending outward and generally perpendicular to the top wall 16. The tubes consist of a first tube 18a connected to a fuel tank (not shown), a second tube 18b connected to a purge line (not shown), and a third tube 18c vented to the atmosphere. The interior chamber of the housing 12 is substantially filled with a bed of vapor adsorbent material 20, such as activated carbon. The chamber is split by a movable partition 22 that may consist of a foam layer 26 and a grid 24. The movable partition 22 is biased by multiple coil springs 28 positioned between the bottom wall 14 and the grid 24. Air containing fuel vapors from the fuel tank enters the fuel vapor storage canister through the first tube 18a. The fuel vapors are adsorbed by the activated carbon bed 20 before the filtered air is released into the atmosphere through the third tube 18c. A baffle 21 forces the air to take a longer path through the activated carbon bed 20 before being released through the third tube 18c. In this manner, the amount of fuel vapor that is absorbed is increased. Fuel vapors may be purged from the canister to the engine during engine operation through the second tube 18b.

Figure 2:
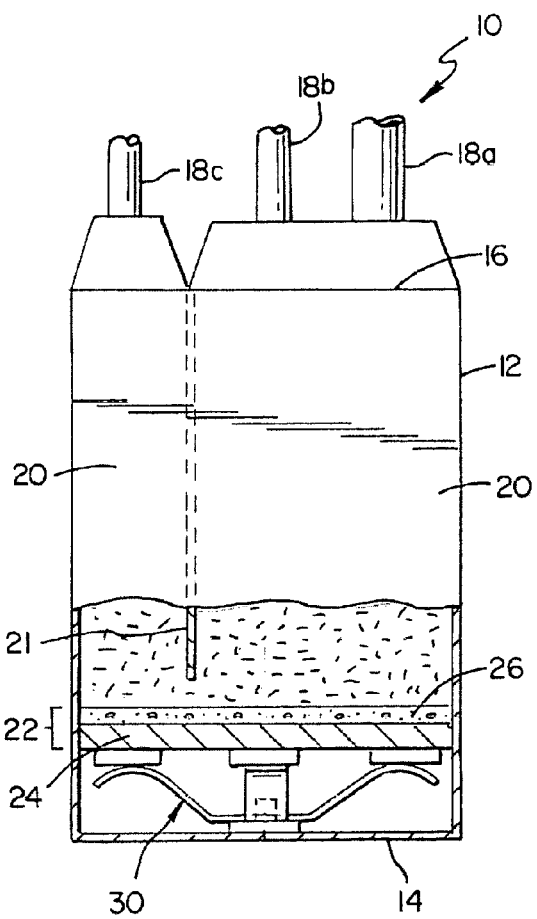
FIG. 2 is a cross-section of a fuel vapor canister with an X-shaped spring volume compensator, according to a first embodiment.

FIG. 2 illustrates a fuel vapor storage canister 10 according to a first aspect of the invention. The multiple coil springs 28 used in the prior art are replaced by a single spring 30 having at least three legs that exert pressure against a movable partition 22. The partition may include a foam layer 26 and a grid 24 as in the prior art. The spring 30 comprises a plurality of legs spaced apart to provide balanced pressure on the grid 24 and to prevent the grid 24 from twisting in the canister housing 12. The legs may provide a more balanced pressure than can be achieved through the use of multiple coil springs with individual variances.

Figure 3:
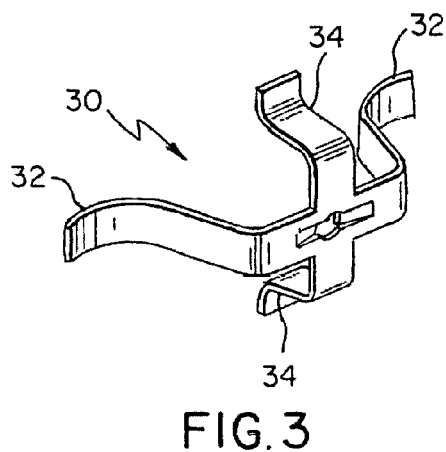
FIG. 3 is an isometric view of the X-shaped spring of the volume compensator of FIG. 2.

In the embodiment shown in FIGS. 2 and 3, the spring 30 includes four evenly spaced legs, a first pair of opposing legs 32 and a second pair of opposing legs 34 that are deflected by and exert pressure on the grid 24. While the spring rate may vary between the first pair of opposing legs 32 and the second pair of opposing legs 34, each pair of legs provides balanced pressure. The spring 30 may be constructed of two or more angularly offset band springs or may be formed from a unitary member In addition to providing more balanced pressure than the prior art device having multiple coil springs 28, the new volume compensator depicted in FIGS. 2 and 3 will also be easier and less expensive to manufacture. The spring 30, whether formed from a unitary member or individual band springs, should be less expensive than six individual coil springs. Additionally, use of the spring depicted in FIG. 3 should simplify the assembly process thereby reducing the assembly time of the fuel vapor storage canister. The reduction in material expenses as well assembly time will result in significant cost savings.

What is claimed is:
1. A fuel vapor storage canister comprising:
 a canister having a vapor storage chamber of variable volume;
 a partition that is movable within the canister and which partially defines the vapor storage chamber;

a vapor adsorbing material in the vapor storage chamber; and a volume compensator comprising a spring having at least three legs that are deflected by and exert pressure against the movable partition to control the volume of the vapor storage chamber.

2. A fuel vapor storage canister as claimed in claim 1, wherein the legs of the spring are spaced apart to exert balanced pressure against the partition.

3. A fuel vapor storage canister as claimed in claim 1, wherein said at least three legs comprises a first pair of opposing legs and a second pair of opposing legs, wherein the first pair of opposing legs possesses a first spring rate and the second pair of opposing legs possesses a second spring rate.

4. A fuel vapor storage canister as claimed in claim 1, wherein the spring is formed from a unitary member.

5. A fuel vapor storage canister as claimed in claim 1, wherein said at least three legs comprise a first pair of opposing legs and a second pair of opposing legs.

6. A fuel vapor storage canister comprising:
   a canister having a vapor storage chamber of variable volume;
   a partition that is movable within the canister and which partially defines the vapor storage chamber;
   a vapor adsorbing material in the vapor storage chamber; and
   a volume compensator comprising first and second band springs each having a pair of opposing legs, the first and second band springs being angularly offset from one another to exert balanced pressure against the partition.

7. A method of assembling a fuel vapor storage canister comprising the steps of:
   providing a canister having a vapor storage chamber of variable volume;
   providing a partition that is movable within the canister and which partially defines the vapor storage chamber;
   providing a vapor adsorbing material in the vapor storage chamber;
   providing a volume compensator comprising a spring having at least three legs; and
   positioning the spring inside the canister such that the spring is deflected by and exerts pressure against the movable partition to control the volume of the vapor storage chamber.

* * * * *